Sept. 28, 1965  M. MAYRATH  3,208,581
ONE-WAY LOCKING MOUNT FOR CONVEYOR TRANSFER PULLEYS
Filed July 2, 1962

INVENTOR:
Martin Mayrath

By: Homer R. Montague
ATTORNEY

United States Patent Office 3,208,581
Patented Sept. 28, 1965

3,208,581
ONE-WAY LOCKING MOUNT FOR CONVEYOR
TRANSFER PULLEYS
Martin Mayrath, 10707 Lennox Lane, Dallas, Tex.
Filed July 2, 1962, Ser. No. 206,797
7 Claims. (Cl. 198—213)

This invention concerns the drive belt arrangements for conveyors, especially for conveyors of such length as to require a plurality of drive belts connected in series between a prime mover (engine, motor or the like) and a final driven pulley; there being a double-groove transfer pulley, or several of these, to transfer the drive power from belt to belt.

In an earlier-filed copending application, U.S. Serial No. 110,172, filed May 15, 1961, in the name of Martin Mayrath and assigned to the owner of the present application, there was described a transfer pulley so mounted as to permit a limited degree of movement of the transfer pulley along a line connecting the centers of the pulleys lying to either side of the transfer pulley in the drive. The present invention constitutes an improvement in that design in several respects.

Multiple belt drives of the kind requiring transfer pulleys are usually clutched and de-clutched by physical movement of the prime mover or engine to change the distance from its output pulley to the next succeeding driven pulley; in other words, by a belt tension control of sufficient range to allow at least one belt to become so slack that it will not transmit the drive at all. The invention will be described with reference to such an arrangement, although (as will appear) it need not in fact be the engine which is moved for the stated purpose. In any case, the underlying concept in the use of self-adjusting transfer pulleys as described in the copending application mentioned above is that each time the engine is moved away from the next succeeding pulley (to tension the first belt and engage the drive), the increase in tension is distributed amongst all of the series-connected belts, so that the tension is equalized among them, and any differential stretch (due to aging, for example) is automatically removed as a source of looseness that would otherwise involve a relatively cumbersome manual readjustment of the position of a transfer pulley, or of several such pulleys in a series. While the prior invention represented a substantial improvement over the prior art, it introduced problems which are solved by the present construction.

One such problem resulted from the fact that the central plane of the transfer pulley was offset from the true centerline of the pulleys or pulley-sets between which it was disposed, so that as the transfer pulley took up different positions, accuracy of belt alignment suffered. A second problem resulted from the fact, especially noticeable in the conveyors requiring two or more transfer pulleys, that the amount of movement of the engine pulley required to de-clutch the drive was greatly increased, because the total slack was distributed amongst all the belts. It was found that when enough slack was introduced to allow any one belt to slip, as desired for de-clutching, one or more of the slacked belts would run off its pulleys; usually, the top (or "last") belt in the series would run off, constituting a serious annoyance to the operator, as this belt is the most difficult to replace. A third problem arose due to the fact that users often installed the transfer pulley improperly, resulting in unsatisfactory operation.

It is accordingly a principal object of the present invention to improve the previously-designed transfer pulley so as to retain its basic advantages, but to overcome its shortcomings. More specifically, it is an object of the present invention to devise a transfer pulley mount which will enable the pulley to be and remain in accurate alignment with its neighboring pulleys, regardless of the extent of its motion within the range permitted by the design.

A further object of the invention is to improve the prior design by providing a transfer pulley mount that will allow the desired free movement of the pulley needed to compensate for belt wear, stretch and the like (that is, in the direction away from the succeeding driven pulley), but will be prevented from moving automatically in the opposite direction. The satisfactory accomplishment of this aim provides a clutchable drive in which the de-clutching action slacks only one of the belts in the series, and neither that belt nor the others in the series needs to be slacked excessively; the danger of run-off being thus practically eliminated.

Still another object of the invention is to provide a transfer pulley mount whose design is such that it is almost impossible for a user to install it in an incorrect position. This is accomplished very neatly, not by constraining the design itself, but by introducing a symmetrical feature such that almost any possible arrangement of the parts is a suitable one for the purposes in view.

Briefly, the invention accomplishes its aims by mounting the double-groove transfer pulley itself at the end of a semicircular loop of bar stock whose main body portion has its axis directed precisely in the plane of symmetry between the two grooved portions. This main body portion passes through aligned bearing holes in the flanges of a channel-section support, and within the channel are disposed components forming a one-way lock arrangement by which the transfer pulley is permitted to move freely in the desired direction (away from the next succeeding driven pulley) but is automatically locked against motion in the other direction. This lock can, of course, be manually released when required.

The invention will best be comprehended by proceeding now to a detailed description of a preferred form thereof, given by way of illustration and example, and not for purposes of limitation. In the accompanying drawings.

Figure 1:
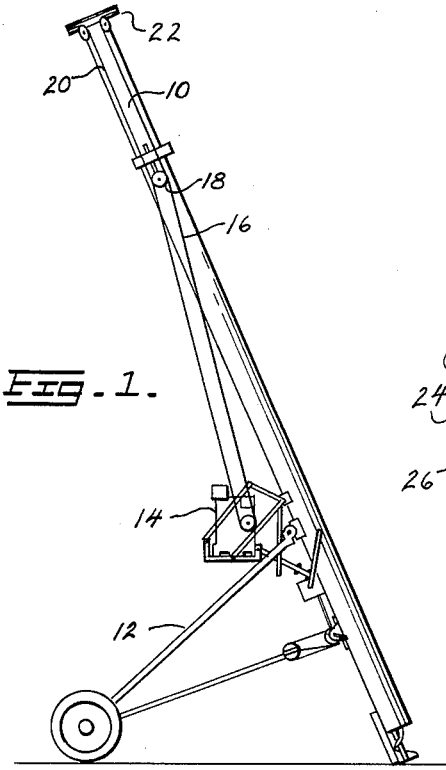
FIG. 1 is a view in side elevation of a typical form of grain auger or conveyor to which the invention may be applied.

Referring first to FIG. 1 of the drawings, a complete conveyor utilizing the inventive improvement is illustrated by way of aiding the understanding of the background and environment of the invention. The conveyor is of the auger type including the usual auger tube 10, a wheeled supporting framework 12 having known provisions for adjusting the angle of elevation of the tube 10, and a drive engine 14 with provisions, also of a known kind, whereby it can be moved (either rotationally or on a rectilinearly sliding mount) so as to allow the operator to control the application of power from its drive pulley to a first belt 16 extending to one groove of a double-groove transfer pulley assembly 18. From the other groove of the transfer pulley, a second belt 20 extends to the auger drive pulley 22 over suitable and well known idlers as shown. However, as will be understood, the arrangement may include more than two series-related belts, and a correspondingly increased number of transfer pulley assemblies.

Figure 2:
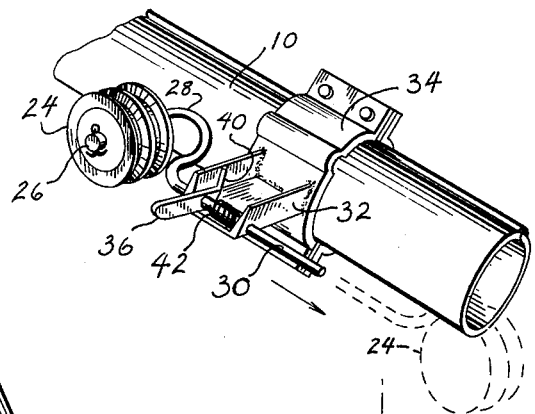
FIG. 2 is a view in perspective, to a much larger scale, of a portion of FIG. 1 directly concerned with the invention.
Figure 3:
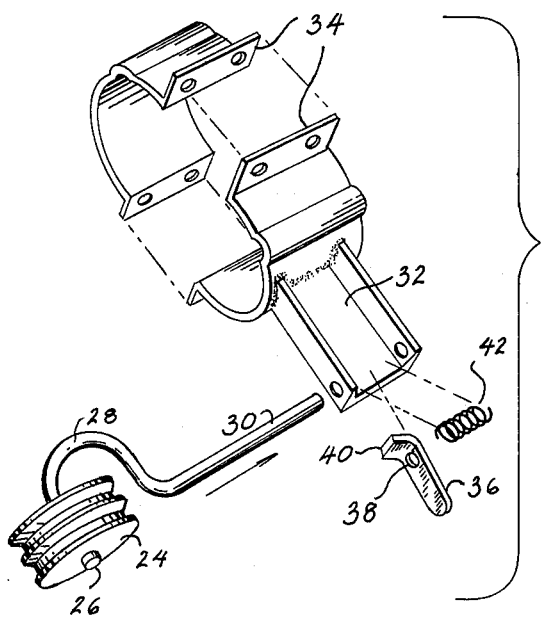
FIG. 3 is an exploded view of the parts of the invention.
Figure 4:
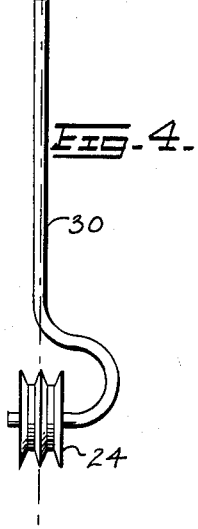
FIG. 4 is a detail view of the transfer pulley sheave and its mounting stem.

The detailed construction of the transfer pulley assembly is more clearly shown in FIGS. 2, 3 and 4, and reference is first made to the assembly view of FIG. 2. In that figure, numeral 24 designates the pulley sheave itself, the two peripheral grooves being clearly shown, and the sheave being journaled upon a spindle 26 connected by a loop 28 to the straight shank portion 30 of the pulley-carrying rod. Elements 26, 28 and 30 are merely different portions of a single cylindrical rod, the loop 28 being provided to place the spindle portion 26 transverse to the direction of the axis of straight portion 30, and in a common plane therewith, the said axis being directed straight at the midplane of the sheave, as emphasized in FIG. 4. Cotter pins through the apertured spindle portion may be used to secure the sheave against fortuitous removal and against sliding onto the looped portion 28, or any equivalent bearing arrangement may be substituted.

Straight shank portion 30 is slidably received in a support constituted by a short length of channel-shaped sheet metal 32 welded at one end to one half of a separable clip or clamp 34 encircling the auger tube 10, as shown. The side walls of this support channel are apertured to slidably receive the shank 30, and between said side walls there is provided a lock plate 36 having an aperture 38 (FIG. 3) somewhat larger than the diameter of shank 30 so that it will grip the shank if it is canted beyond a certain angle. Lock plate 36 has one end bent as shown at 40 to serve as a fulcrum against one of the channel side walls, and a spiral compression spring 42 surrounds shank 30 and urges the lock plate to an angled position with reference to the plane of the adjacent side wall. The similarity of this lock to the conventional door-transom lock will be recognized. It permits the shank 30, and hence the sheave 24, to move freely in the direction of the arrows in FIGS. 2 and 3 under the differential tension of the two belts 16 and 20, but prevents any motion in the opposite direction. The lock plate and spring are trapped effectively within the channel support, and the lock may be released by manually moving the lock plate against the pressure of the spring 42.

The permitted direction of motion of the transfer pulley sheave is the direction away from the auger drive pulley 22 and hence towards the engine 14. Therefore, as belt 20 stretches, the transfer pulley is pulled in the direction of the arrow in FIG. 2, by the tension of the belt 16 (that is, whenever engine 14 is moved so as to engage the clutch by tightening belt 16). Lock plate is rotated slightly against the tension of spring 42 as the shank 30 moves in the said direction, freeing the shank from the edges of the aperture 38 in an obvious manner. When, however, the tension in belt 16 is again slacked off, to de-clutch the drive, plate 36 locks shank 30 against movement in the direction opposite to the arrow, and the tension of belt 20 is fully maintained. Hence, it is only necessary for the movement of the engine or its output pulley to be sufficient to slack off the single belt 16, or, in an entirely equivalent manner, only the first belt of a plurality greater than two. When necessary, the lock plate can be released by hand, as described above, for example as an aid in removing a belt 20.

From the standpoint of correct installation, the device is extremely simple. As suggested by the dash line showing of sheave 24 and shank 30 in FIG. 2, the action is precisely the same even if the shank is installed in support 32 in the direction opposite to that described above. Moreover, since the geometrical center of the sheave 24 lies precisely on the axis of the shank 30, the sheave can be positioned with loop 28 either inward or outward without affecting the operation; in fact, the best orientation of the sheave with respect to the input and output belts will be assumed automatically. About the only possibility of an erroneous installation would be the inversion of the positions of lock plate 36 and the spring, and a wrong guess as to this would immediately be made obvious to the one making the installation.

The construction described above satisfies all of the aims of the invention in a simple, efficient and economical manner, but it will be recognized by those skilled in this art that changes may be made as to details without departing from the true spirit and scope of the invention as defined in the appended claims.

What is claimed is:

1. In a belt drive conveyor of the type including an elongated conveyor structure, a driven pulley at one end of said structure, a driving pulley mounted adjacent said structure remote from said one end thereof and bodily movable in a path generally parallel to the length of the structure to clutch and de-clutch the belt drive, a transfer pulley intermediate said driven pulley and said driving pulley, and respective belts connecting said driven pulley and said driving pulley to said transfer pulley, the improvement which comprises a transfer pulley arrangement for belt drives of such multiple series belt type, comprising a slide rod having a straight shank portion and a looped end terminating in a spindle directed transverse to the direction of said shank portion, a double-groove sheave carrying said respective belts and journaled on said spindle with its central plane directed along the axis of said shank portion, a support on said conveyor structure slidably receiving said shank portion, and a one-way latch connection between said rod and said support arranged to permit free movement of said rod in the axial direction away from said driven pulley and to block movement thereof in the opposite direction.

2. A transfer pulley arrangement in accordance with claim 1, in which said connection includes a pivotally mounted lock plate having an aperture loosely receiving said shank portion, and means for biasing said lock plate into cocked locking relation to said shank portion.

3. A transfer pulley arrangement in accordance with claim 1, in which said support comprises a length of channel-shaped material having its side walls apertured to receive said shank portion.

4. A transfer pulley arrangement in accordance with claim 1, in which said support comprises a length of channel-shaped material having its side walls apertured to receive said shank portion, and in which said connection includes a lock plate pivotally disposed between said side walls and having an aperture loosely receiving said shank portion, and means for biasing said lock plate into cocked locking relation to said shank portion.

5. A transfer pulley arrangement in accordance with claim 1, in which said shank portion is of cylindrical shape.

6. A transfer pulley arrangement in accordance with claim 2, in which said biasing means comprises a helical spring surrounding said shank portion.

7. A transfer pulley arrangement in accordance with claim 4, in which said biasing means comprises a helical spring surrounding said shank portion and positioned between said lock plate and one of said side walls.

References Cited by the Examiner

UNITED STATES PATENTS

| 2,311,993 | 2/43 | Olsen | 74—242.13 |
| 2,630,905 | 3/53 | Howe | 198—213 |
| 2,645,845 | 7/53 | Vengris | 15—230 |
| 3,062,066 | 11/62 | Mohr | 74—242.13 |

FOREIGN PATENTS 765,145   3/34   France.

SAMUEL F. COLEMAN, Primary Examiner.

WILLIAM B. LA BORDE, ERNEST A. FALLER, JR.,
Examiners.